3,745,036
OPTICAL BRIGHTENING COMPOSITION AND METHOD OF BRIGHTENING FIBRES MADE OF CELLULOSE AND POLYAMIDE

Reinhard Zweidler, Basel, Switzerland, assignor to Ciba-Geigy Corporation, Ardsley, N.Y.
No Drawing. Continuation of application Ser. No. 774,594, Nov. 5, 1968, which is a continuation of application Ser. No. 463,955, June 14, 1965, both now abandoned. This application May 7, 1971, Ser. No. 141,419
Int. Cl. C09k 1/00
U.S. Cl. 117—33.5 T                4 Claims

ABSTRACT OF THE DISCLOSURE

The process of optically brightening cellulose, cellulose acetate, and polyamide fibres in an aqueous solution by treating the fibres with an aqueous solution of optical brightener of the formula:

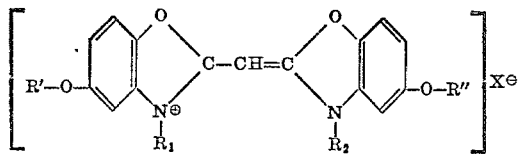

wherein R' and R" are low alkyl; $R_1$ and $R_2$ are low alkyl; and X is a colourless anion; and a fatty alcohol polyglycol ether.

---

This application is a continuation of application Ser. No. 774,594 filed Nov. 5, 1968, now abandoned, which in turn is a continuation of application Ser. No. 463,955, filed June 14, 1965, now abandoned.

The present invention concerns a process for the optical brightening of fibres made of cellulose, which may or may not be esterified, or of polyamide as well as the material optically brightened by the process according to the invention.

It is known that many usual commercial optical brighteners are partially or wholly inactive in the presence of non-ionic wash-active substances. The few brighteners which are active under these conditions, however, have various disadvantages such as bad fastness to light or an undesirable reddish fluorescence, or they only brighten one type of fibre.

There is thus a need for optical brighteners which effectively brighten various types of fibres in sufficiently fast, particularly light fast, white shades which are as neutral as possible.

It has now been found that fibres made of optionally esterified cellulose or of polyamide can be given a beautiful white shade if this material is treated with an aqueous solution containing an optical brightener of Formula I

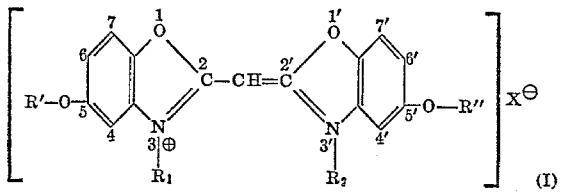

wherein

R' and R" each represent a low alkyl group having at most 4 carbon atoms, $R_1$ and $R_2$ each represent a low unsubstituted or non-ionogenically substituted alkyl group having at most 4 carbon atoms, and X represents a colourless anion, and also containing a fatty alcohol polyglycol ether having an alkyl radical of 10 to 20 carbon atoms and at least 8 alkyleneoxy groups or an alkylphenol polyglycol ether having alkyl radicals of, in all, 8 to 12 carbon atoms and 8 to 20 alkyleneoxy groups.

In Formula I, R', R", $R_1$ and $R_2$ represent, preferably, the methyl or ethyl group. Non-ionogenically substituted alkyl groups in the position of $R_1$ and $R_2$ contain, as substituents, for example a cyano group or halogen; examples are the β-cyanoethyl group or a halogenoalkyl group such as the β-chloroethyl group.

X represents, for example, chloride, bromide or the equivalent of an aryl sulphonic acid or the sulphuric acid.

In particularly active compounds of Formula I which are preferred because of their pure white shade, R', R", $R_1$ and $R_2$ each represent the methyl group and X is the equivalent of an aryl sulphonic acid, in particular the equivalent of p-toluene, p-chlorobenzene or benzene sulphonic acid.

The compounds of Formula I which are usable according to the invention are produced as described in U.S. Patent No. 2,620,282.

The compounds of Formula I are pale yellowish to yellowish powders. They draw well from aqueous baths onto fibres made of cellulose such as cotton, cellulose esters such as cellulose acetates, or polyamide, particularly synthetic polyamide such as nylon or perlon.

By fatty alcohol polyglycol ethers with an alkyl radical of 10–20 carbon atoms and having at least 8 alkyleneoxy groups, are meant, preferably, reaction products of decyl, glycol ethers with alkyl radicals containing, in all, 8 to 12 15–25 equivalents of ethylene oxide. As alkylphenol polyglycol ethers with alkyl radicals containing, in all 8 to 12 carbon atoms and having 8 to 20 alkylenoxy groups can be mentioned, chiefly, reaction products of monoalkyl phenols, the alkyl radicals of which contains 8 to 12 carbon atoms, and preferably 10 to 15 equivalents of ethylene oxide.

Nonylphenol polyglycol ether having about 12 ethyleneoxy groups is preferred.

The amount of optical brightener of Formula I in the aqueous solution is preferably 0.02 to 0.4%, calculated on the material to be brightened; the content of fatty alcohol polyglycol ether or alkylphenol polyglycol ether as defined is advantageously 0.2 to 4%, also calculated on the material to be brightened. Generally the liquor ratio is 1:30 to 1:100, particularly 1:30 to 1:40.

In addition, the brightener solution can also contain the usual auxiliaries and fillers, for example alkali polyphosphates, polymetaphosphates, silicates, borates, alkali metal salts of carboxymethyl celluloses, foam stabilisers such as alkanolamides of higher fatty acids or complex compounds such as soluble salts of ethylenediamine tetraacetic acid. That brighteners of Formula I usable according to the invention are stable to alkali polyphosphates, polymetaphosphates, silicates, borates and alkali metal salts of carboxymethyl celluloses is surprising as it is known that benzoxazoles, especially oxacyanines, saponify extraordinarily quickly in alkaline solution.

The fibres made of cellulose which may or may not be esterified or of polyamide optically brightened according to the invention have a beautiful blueish white shade which is fast to light.

Further details can be seen from the following examples. Temperatures are given therein in degrees centigrade. Parts are parts by weight.

EXAMPLE 1

20 g. of a nylon staple fibre fabric are introduced at a temperature of 40° into a liquor which contains 0.005 g. of a brightener of the formula

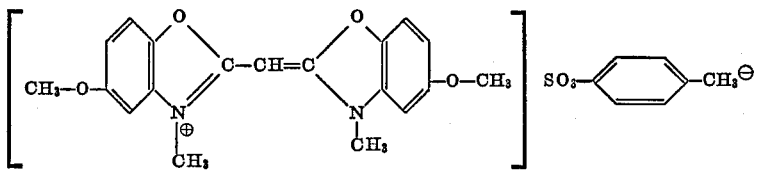

and 1.2 g. of a detergent consisting of 11 parts of nonylphenol polyglycol ether having 12 ethyleneoxy groups, 11 parts of water, 33 parts of sodium tripolyphosphate, 11 parts of sodium pyrophosphate, 20 parts of sodium sulphate, 2 parts of sodium carbonate and 2 parts of the sodium salt of carboxymethyl cellulose in 600 ml. of water. The fabric is washed for 30 minutes, then rinsed first in lukewarm and then with cold water and dried. The fabric so treated has a beautiful brilliant white effect in daylight.

A considerably stronger brightening effect is obtained if in the above example, instead of the 0.005 g. of brightener, 0.02 g. of this brightener are used and otherwise the same procedure is followed.

Similar brightening effects are obtained if, with otherwise the same procedure, instead of the brightener mentioned in this example, about the same amounts of the compounds given both in the following table and also in Example 10 are used.

TABLE I
General Formula $$\left[ R'-O-\underset{\underset{R_1}{N_\oplus}}{\bigcirc}\underset{O}{\bigcirc}C-CH=C\underset{O}{\bigcirc}\underset{\underset{R_2}{N}}{\bigcirc}-O-R'' \right] X^\ominus$$

| No. | R' | R'' | $R_1$ | $R_2$ | $X^\ominus$ |
|---|---|---|---|---|---|
| 2 | —CH₃ | —C₂H₅ | —CH₃ | —CH₃ | SO₃—⌬ |
| 3 | —CH₃ | —CH₃ | —CH₃ | —CH₃ | SO₃—⌬—Cl |
| 4 | —CH₃ | —CH₃ | —CH₃ | —CH₃ | Cl |
| 5 | —CH₃ | —CH₃ | —CH₃ | —CH₃ | SO₄/₂ |
| 6 | —CH₃ | —CH₃ | —CH₂ | —C₂H₅ | SO₃—⌬—CH₃ |
| 7 | —CH₃ | —CH₃ | —C₂H₅ | —C₂H₅ | SO₃—⌬—CH₃ |
| 8 | —CH₃ | —CH₃ | —C₂H₅ | —CH₃ | SO₃—⌬ |
| 9 | —C₂H₅ | —C₂H₅ | —CH₃ | —CH₃ | SO₃—⌬—CH₃ |

EXAMPLE 10

20 g. of nylon woven tricot are introduced into a 40° warm liquor which contains 0.01 g. of the brightener of the formula

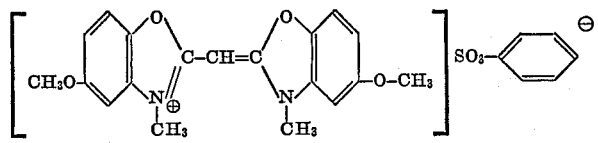

and 1.2 g. of the non-ionogenic detergent described in Example 1 in 600 ml. of water, and the tricot is washed for 20 minutes. The fabric is then rinsed first in lukewarm and then in cold water and dried. The fabric so treated has a beautiful, brilliant white effect in daylight.

A considerably stronger brightening effect is obtained if, in the above example, 0.06 g. of the brightener are used instead of the 0.01 g. of brightener.

Similar brightening effects are obtained if, with otherwise the same procedure, instead of the brightener mentioned in this example, about the same amounts of one of the compounds given in Examples 1–9 are used.

EXAMPLE 11

20 g. of a dull acetate silk fabric are washed for 30 minutes in a 40° warm liquor which contains 0.005 g. of the brightener mentioned in paragraph 1 of Example 1 and 1.2 g. of the non-ionogenic detergent mentioned in Example 1 in 600 ml. of water. The fabric is then rinsed first with lukewarm and then with cold water and dried. The fabric so treated has a beautiful brilliant white effect in daylight.

A considerably stronger brightening effect is obtained if, in the above example, instead of 0.005 g. of brightener, 0.02 g. are used.

Similar brightening effects are obtained if, with otherwise the same procedure, about the same amounts of one of the compounds mentioned in Examples 2 to 10 are used instead of the brightener mentioned.

EXAMPLE 12

10 g. of cotton cretonne are washed for 12 minutes in 300 ml. of a 40° warm liquor containing 0.6 g. of a detergent consisting of 11 parts of nonylphenol polyglycol ether having 12 ethyleneoxy groups, 11 parts of water, 33 parts of sodium tripolyphosphate, 11 parts of sodium pyrophosphate, 20 parts of sodium sulphate, 2 parts of sodium carbonate and 2 parts of the sodium salt of carboxymethyl cellulose, which liquor also contains 0.02 g. of the brightener mentioned in paragraph 1 of Example 1. After rinsing and drying, the fabric so treated has a beautiful white effect. A considerably stronger white shading is obtained if, in this example, instead of 0.02 g. of the brightener mentioned, 0.04 g. thereof are used.

If the brightener mentioned above is replaced by equimolar parts of the compounds given in Table I then, with the same procedure as described in Example 1, fabrics having a similar brightening effect are obtained.

A good brightening effect is also obtained if, in the detergent mentioned above, the nonylphenol glycol ether is replaced by the same amounts of a condensation product of octyl phenol and 10 mol of ethylene oxide or a salt of carboxymethyl cellulose, which liquor also concondensation product of octadecyl alcohol and 20 mol of ethylene oxide.

EXAMPLE 13

10 g. of a mixed fabric of nylon and cotton are obtained (mistake in German—"washed" was intended) for 12 minutes in 300 ml. of a 35–40° warm liquor which contains 2 g. of a non-ionogenic detergent consisting of 20 parts of nonyl phenol polyglycol ether having 12 ethyleneoxy groups, 40 parts of sodium tripolyphosphate and 40 parts of sodium sulphate, which liquor also contains 0.04 g. of the brightener given in paragraph 1 of Example 1. After rinsing and drying, fabric so treated has a strong white effect in daylight. The action of the detergent does not injure the brightening effect and both the nylon and the cotton components of the fabric are brightened.

A similar brightening effect is obtained if the brightener mentioned above is replaced by equimolar amounts of one of the brighteners given in Table I. Also, in the detergent above mentioned, the nonylphenol glycol ether can be replaced by about the same amounts of a condensation product of octyl phenol and 11 mol of ethylene oxide or of a condensation product of octadecyl alcohol and 20 mol of ethylene oxide. The fabrics so treated also have a similar brightening effect.

What is claimed is:

1. A process for the optical brightening of fibers selected from the group consisting of cellulose, esterified cellulose, or polyamide, in the presence of a non-ionic wash active substance, comprising treating the fibers with an aqueous solution which contains an optical brightener of the formula:

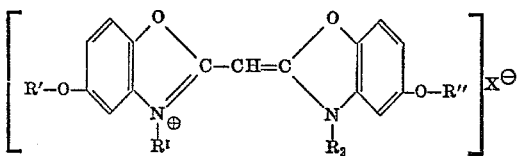

wherein $R_1$, $R_2$, $R'$ and $R''$ is methyl or ethyl, and

X is a colorless anion selected from the group consisting of Cl—, ½ $SO_4$—, $CH_3SO_3$—, benzene sulfonate, p-chlorobenzene sulfonate or p-toluene sulfonate and a fatty alcohol polyglycol ether selected from the group consisting of a fatty alcohol polyglycol ether having an alkyl radical of 10-20 carbon atoms and at least 8 alkyleneoxy groups, and a fatty alcohol polyglycol ether that is an alkylphenyl polyglycol ether having alkyl radicals of 8-12 carbon atoms and 8-20 alkyleneoxy groups.

2. The process according to claim 1 wherein $R_1$, $R_2$, $R'$ and $R''$ is methyl, X is a colorless anion selected from the group consisting of benzene sulfonate, p-chlorobenzene sulfonate or p-toluene sulfonate and the fatty alcohol polyglycol ether is a nonylphenol polyglycol ether having 12 ethyleneoxy groups.

3. An optical brightening composition having an effective amount of a non-ionic wash active detergent comprising an aqueous solution of:

(1) An amount sufficient to provide optical brightening of an optical brightener of the formula:

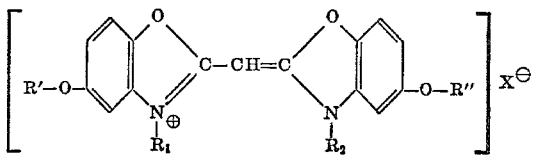

wherein $R_1$, $R_2$, $R'$ and $R''$ is selected from the group consisting of methyl or ethyl, and X is a colorless anion selected from the group consisting of Cl—, ½ $SO_4$—, $CH_3SO_3$—, benzene sulfonate p-chlorobenzene sulfonate or p-toluene sulfonate, and (2) a fatty alcohol polyglycol ether selected from the group consisting of a fatty alcohol polyglycol ether having an alkyl radical of 10-20 carbon atoms and at least 8 alkyleneoxy groups, and a fatty alcohol polyglycol ether that is an alkylphenol polyglycol ether having alkyl radicals of 8-12 carbon atoms and 8-20 alkyleneoxy groups.

4. An optical brightening composition according to claim 3 wherein $R_1$, $R_2$, $R'$ and $R''$ is methyl, X is a colorless anion selected from the group consisting of benzene sulfonate, p-chlorobenzene sulfonate or p-toluene sulfonate and the fatty alcohol polyglycol ether is a nonylphenol polyglycol ether having 12 ethyleneoxy groups.

References Cited

UNITED STATES PATENTS 2,620,282   12/1952   Fry et al. _____ 117—33.5

FOREIGN PATENTS 571,778   3/1959   Canada _____ 252—89

ALFRED L. LEAVITT, Primary Examiner

C. WESTON, Assistant Examiner

U.S. Cl. X.R.

252—301.2 W